Patented Dec. 11, 1951

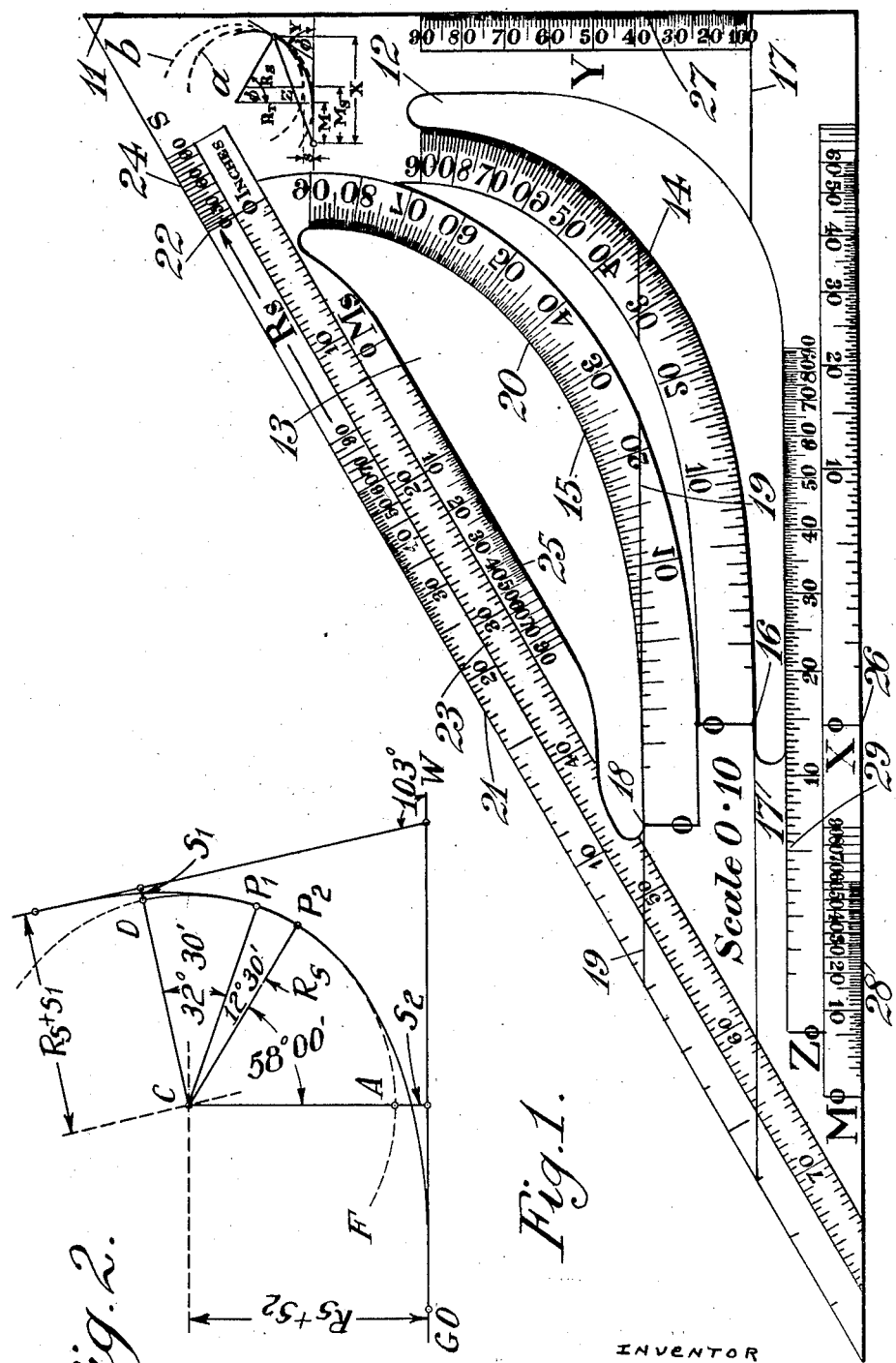

2,578,483

UNITED STATES PATENT OFFICE 2,578,483

TRANSITION CURVE PLOTTER FOR ROADS
AND RAILWAYS AND OTHER PURPOSES

Francis Thomas Murray, Padstow, Cornwall,
England

Application June 1, 1948, Serial No. 30,288
In Great Britain June 6, 1947

2 Claims. (Cl. 33—1)

This invention comprises improvements in or relating to plotters for drawing transition curves in their proper relation to straight lines, circles or other transition curves and may be regarded as a continuation-in-part of abandoned application Serial No. 685,489, filed July 22, 1946 for Means for Plotting Transition Curves, Cams and the like.

A plotter according to this invention may comprise sheet material having a straight base line, and a curved edge shaped to afford a transition curve from an origin on the base line, together with a straight scale of radii marked on the plotter having graduations the distances of which along the scale correspond to the radii of curvature of the curve at successive points thereon. The graduations along the scale and graduations along the curved edge are marked to show the corresponding points thereon. By the use of such a plotter it is possible not only to determine the point on the transition curve which corresponds in radius of curvature with the radius of a circular arc with which it may be required to connect and to draw the transition curve, but by employing the plotter in different sizes each an exact enlargement or diminution of a master plotter, innumerable alternative combinations of transition and circular arc may be tried out in a minimum time in order to obtain the best for any given conditions.

If the graduations on the scale of radii and along the curve are marked in terms of the angles made by tangents to the curve with the base line this further facilitates the determination of the point of connection of the transition curve with the circle when it is set in its proper relation to the base line. A scale of length may furthermore be marked alongside the scale of radii to enable the lengths of the radii to be read off directly.

It is possible to mark further scales on the plotter showing the lengths of various other lines which may be required in the geometrical construction of the curve, and radii of circles connected therewith, so that such other lengths may be equally readily determined.

Plotters according to this invention, being made to different scales, each an exact enlargement or reduction of the master plotter, are therefore capable of suiting the making of drawings of curves of any desired scale. The master plotter will be drawn to the scale of a basic curve the functions of which will have been calculated and tabulated, and the plotter is intended to be used in connection with the curve tables in terms of which it is manufactured.

The following is a description by way of example of a plotter in accordance with the invention and of the method of using the same, reference being made to the accompanying drawings in which:

Figure 1 is a representation of the plotter.

Figure 2 is a diagram indicating the method of use thereof.

The plotter comprises a triangular Celluloid sheet 11 out of which are cut two openings 12, 13. The opening 12 is shaped along the edge 14 to provide a transition curve, the material of the plotter being disposed on the inside of the curve, whereas the opening 13 is shaped along the edge 15 to the same transition curve as the edge 14 but the material of the plotter is disposed around the outside of the curve. Which edge, 14 or 15, is employed by the draughtsman will depend upon his convenience. The transition curve 14 starts from an origin at 16 where it runs into a base line 17 marked upon the plotter, and similarly the transition curve 15 starts from an origin 18 on a base line 19. The precise shape of the curves 14, 15 may be that of any suitable transition curve; the curve described in my prior British patent specification No. 585,204 is suitable.

Each of the curves 14, 15 is provided around its edge with graduations which are marked in terms of the angles made by tangents to the curves with the base lines 17, 19; that is to say, for example, at the point 20 on the curve 15, which is marked with the angle 40° on the plotter, the tangent to the curve will be at 40° to the base line 19 and so on for all the other graduations. It will be observed that the figures on the scale of angles are alternately marked so as to read from opposite sides of the Celluloid sheet of which the scale is made, and this is convenient as it permits the curve to be used either right-handedly or left-handedly and to be reasonably easily read from either side.

The Celluloid 11 of which the plotter is made is conveniently shaped as a set-square, and the inclined edge 21 carries a scale beginning at the point marked O (reference numeral 22) which scale shows by its graduations the lengths of the radii of curvature of the transition curves 14 and 15. That is to say for example the radius of curvature of the curve 14 as angle 40° is the same as the distance on the scale 21 from the point 22 to the graduation which is marked 40°, and so on. This scale is marked $R_s$ and it will be observed that a diagram is inscribed on the corner of the set-square 11 which shows a dotted circle $a$ fitted to a transition curve and having a radius $R_s$. Other lines of the geometrical construction are included in this diagram and help to remind the user of the various quantities which he may need in the use of the plotter.

Adjacent to the $R_s$ scale is a scale of inches 23 which can be used to read off directly against the scale 21 the actual or scale lengths of the various $R_s$ radii. It will be observed that the plotter is marked "Scale 0.10" which shows that it has been constructed to one tenth of the size of a master transition curve as represented by the basic curve tables, and the scale of inches 23 is therefore marked with the length in inches which corresponds to the actual radii of the master plotter. This scale is divided into tenths and twentieths which corresponds to inches and half inches respectively. In line with the $R_s$ scale is another short scale 24 which is marked $s$, and shows the "shift" that is to say the perpendicular distances by which circles such as the circle $a$ which are fitted to the successive sections of the transition curve would, if prolonged, fall short of reaching the base line 17 or 19 as the case may be. The amount of the "shift" plus the radius of curvature is shown on the scales 21 and 24 as equal to the height of the centre of the circle $a$ above the base line, and therefore shows the height at which the compasses must be set if a circle which is to run into the transition curve is to be drawn, and this enables the heights of the various centres to be obtained directly from the scales $R_s$ and $s$.

In the diagram which is inscribed as above referred to on the plotter, it will be observed that the horizontal distance of the centres from the point of origin, as measured along the base line to a perpendicular from the centres dropped on the base line, is marked $M_s$. The successive distances $M_s$ are marked on a scale 25 which is formed along one side of the opening 13, and this enables the centre of curvature of all the circles $a$ to be readily located.

In the aforesaid diagram inscribed on the plotter the horizontal distance of the point of junction of the circle $a$ with the transition curve, taken from the point of origin of the transition curve, is marked X. On one of the other edges of the plotter there is a scale 26 which shows the values of the distances X in terms of the angular marking of corresponding points on the transition curve. It will be noted that the origin 26 of the scale X is projected from the origin 16 of the transition curve 14, and therefore when this particular curve is being employed the distances X come in their natural relationship to the transition curve 14. Similarly, the vertical heights Y above the base line 17 of the various points on the transition curve are projected on to a scale 27 on an edge of the plotter at right angles to the scale 26 the zero of scale 27 being on line 17. The scales 26, 27 of course apply also to the transition curve 15, but the scales are necessarily not marked on the plotter in the same relationship to the curve 15 as they are able to occupy in relation to the curve 14.

A further scale 28 is marked on the plotter showing the distances M measured along the base line from the point of origin of the transition curve to the perpendiculars from the centres of another set of circles $b$. The circles $b$ are those which are tangential to the transition curve and to the corresponding circles $a$, but are drawn with a larger radius so that instead of being separated from the base line by the shift $s$ they are also tangential to the base line. The circles $b$ represent the circular track which would be required to connect the base line with the circles $a$, for which circles the transition curve is substituted.

Finally there is a scale 29 marked on the plotter which shows the lengths of the chords between the point of origin and the various points along the transition curve. Such a chord is marked Z in the diagram inscribed on the plotter and the scale is therefore marked Z on the plotter.

For the purpose of demonstrating the use of a plotter as just described it is convenient to refer to Figure 2 which is a diagrammatic representation of the application of two transition curve plotters which are of different scale from each other to the drawing of a compound curve joining two straight lines at an angle of 103° to one another.

It will be appreciated that two transition curves of different scale can be joined to one another or to the same circular arc provided the radius of curvature of each at the point of junction is the same. This invention enables many different combinations of transition and circular arc to be tried out in the shortest possible time. It is necessary first to decide the radius $R_s$ of the intervening arc and by measuring this on the radius scale 21 on each plotter the tangential angle of each curve may be found at which the circle will be joined by it.

Referring to Figure 2 the radius $R_s$ of the bigger scale curve at the point where the tangential angle is 58°00′ is equal to the radius of the smaller scale curve at the point where the tangential angle is 32°30′ and therefore at these points the two curves can be joined tangentially or with an intervening circular arc of radius $R_s$.

In Figure 2 a dotted line is drawn parallel to the base line GW at a height above the base line which is ascertained by laying the edge 21 of the plotter at right angles to the base line with the scale 24 set at 58° on the base line, and marking the height of the dotted line $R_s + s_2$ opposite 58° on the scale 21. Similarly taking the smaller plotter a line is drawn, parallel to the second straight line which is to be joined by the curve, at a distance from this line $R_s + s_1$ which is ascertained by placing the edge 21 of the second plotter at right angles to the line with the scale $s$ set at 32°30′ on the line, and the position of the dotted line $R_s + s_1$ is marked from the scale 21 at the position 32°30′ thereon. Where the two dotted lines intersect at C is the centre of a circle which will join the two transition curves, and this circle is shown by the dotted line FAP$_2$P$_1$D. The larger transition curve can then be laid so that its base line coincides with the line GW and the transition curve drawn from O to P$_2$. Similarly, the smaller transition plotter can be laid on the other line at 103° to the first, and a transition curve drawn which joins the circle at P$_1$. Any other combination of the two curves at which their $R_s$ distance is equal to one another can be equally easily tried, and the centre C thus found, whatever might be the angle of divergence of the second straight line from the line GW.

By drawing CP$_2$ and CP$_1$ at an angle of 58°00′ and 32°30′ respectively to the perpendiculars CL and CD the points P$_2$ and P$_1$ can be located at which each transition curve ends and the circular arc begins.

I claim:

1. A plotter comprising sheet material having a straight base line and a curved edge in tangential relationship to the base line and shaped to afford a transition curve of gradually decreasing radius of curvature from an origin on the base line, the transition curve being the envelope of a series of imaginary circles of successively diminishing radii, the parts of which nearest the base line successively recede therefrom, that is, have increasing shift relatively thereto, graduations upon the material of the plotter along the curve which graduations are provided with identification marks, a scale of instantaneous radii of curvature of the transition curve at successive points along its length, said scale being marked correspondingly to the identification marking of said curve, a second scale of amounts of shift, said second scale having also similar identification marking, the first and second scales being located end to end upon the material of the plotter and having a common origin between them.

2. A plotter comprising sheet material having a straight base line and a curved edge in tangential relationship to the base line and shaped to afford a transition curve of gradually decreasing radius of curvature from an origin on the base line, the transition curve being the envelope of a series of imaginary circles of successively diminishing radii, the parts of which nearest the base line successively recede therefrom, that is, have increasing shift relatively thereto, graduations upon the material of the plotter along the curve which graduations are provided with identification marks, a scale of instantaneous radii of curvature of the transition curve at successive points along its length, said scale being marked correspondingly to the identification marking of said curve, a second scale of amounts of shift, said second scale having also similar identification marking, the first and second scales being located upon the material of the plotter.

FRANCIS THOMAS MURRAY.

REFERENCES CITED

The following references are of record in the file of this patent:

UNITED STATES PATENTS

| Number | Name | Date |
| --- | --- | --- |
| 601,630 | Chase | Apr. 5, 1898 |
| 1,402,269 | Tanner | Jan. 3, 1922 |
| 1,633,163 | Crouse | June 21, 1927 |
| 2,001,949 | Weston | May 21, 1935 |
| 2,245,915 | Hartrampf | June 17, 1941 |

FOREIGN PATENTS

| Number | Country | Date |
| --- | --- | --- |
| 565,873 | Great Britain | Dec. 1, 1944 |
| 585,204 | Great Britain | Jan. 31, 1947 |